United States Patent
Kaspar et al.

(10) Patent No.: US 6,349,562 B1
(45) Date of Patent: Feb. 26, 2002

(54) CLOSURE FOR AN AIR CONDITIONER COLLECTION VESSEL

(75) Inventors: Martin Kaspar, Esslingen; Friedrich Krehl, Stuttgart; Kurt Molt, Bietigheim-Bissingen; Siegfried Tews, Stuttgart, all of (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 09/657,550

(22) Filed: Sep. 8, 2000

(30) Foreign Application Priority Data

Sep. 10, 1999 (DE) .......................... 199 43 322

(51) Int. Cl.⁷ ................................ F25B 43/04
(52) U.S. Cl. ................... 62/475; 62/509; 62/474
(58) Field of Search .................. 62/475, 509, 474, 62/473, 512, 298, 299, 239, 195; 165/110, 132

(56) References Cited

U.S. PATENT DOCUMENTS 5,127,237 A * 7/1992 Sendo et al.
5,419,141 A * 5/1995 Burk ........................... 62/474
5,666,791 A * 9/1997 Burk ........................... 62/474
5,992,174 A * 11/1999 Mittelstrass ................. 62/474

FOREIGN PATENT DOCUMENTS

| EP | 0 438 625 | | 8/1994 |
| JP | 06273000 A | * | 9/1994 |
| JP | 06273001 A | * | 9/1994 |

* cited by examiner

*Primary Examiner*—Henry Bennett
*Assistant Examiner*—Chen-Wen Jiang
(74) *Attorney, Agent, or Firm*—Foley & Lardner

(57) ABSTRACT

The application discloses a collection vessel 1 for a condenser of an air-conditioning system, preferably for motor vehicles. The collection vessel 1 holds in its interior a drier that can be exchanged via an opening which can be closed by means of a releasable lid. The lid is designed as a piston-like, cylindrical stopper 3, and be sealed and guided in an axially displaceable manner in a corresponding hole in the collection vessel 1, 2. The stopper 3 is pressed outwardly against a securing ring 9 by the internal pressure (pi) in the vessel, which securing ring is fixed in an annular groove 10 in the collection vessel 2 and is secured against release by a blocking shoulder 8 on the stopper 3. Due to this measure, the lid 3 of the collection vessel 2 cannot be removed when pressure is prevailing inside the vessel. Only when the vessel is depressurized can the securing ring and therefore also the stopper 3 be removed, so that a drier cartridge can be exchanged.

17 Claims, 3 Drawing Sheets

CLOSURE FOR AN AIR CONDITIONER COLLECTION VESSEL

BACKGROUND OF THE INVENTION

The present invention relates to a collection vessel for a condenser of an air-conditioning system, in particular for motor vehicles. The collection vessel contains in its interior a drier which can be exchanged via an opening in the vessel that can be closed by means of a removable lid.

A collection vessel of this general type is known from commonly assigned U.S. Pat. No. 5,419,141 (corresponding to DE-A 43 19293), the entire disclosure of which is hereby incorporated by reference. This collection vessel (also known as a collector) is integrated with a flat-tube condenser in such a manner that the collector and collection tube, into which the flat tubes open out, are arranged parallel and next to one another. In its interior, the collector has a sleeve which is designed as a plastic cage and is filled with drier granules. This sleeve has to be exchanged for maintenance purposes. To this end, the upper region of the collector has a releasable lid that is screwed into and sealed in a corresponding threaded hole in the collector. To exchange the drier cartridges, the lid is unscrewed from the threaded hole, which is large enough for the drier cartridge to be removed. When the lid is mechanically screwed in during production, under certain circumstances the screw thread may become jammed if the start of the threads of the collector and lid are not accurately positioned with respect to one another. This can cause irreparable damage to both parts.

SUMMARY OF THE INVENTION

One object of the present invention is to provide an improved air conditioning system, in particular an improved condenser for an automotive air conditioning system.

Another object is to provide an improved collection vessel for an air conditioning system.

It is a particular object of the invention to provide an improved closure for a collection vessel in an air conditioning system, such that the above-mentioned drawbacks are avoided, the lid is easier to apply to the vessel and it can furthermore be reliably removed.

In accomplishing these and other objects, the present invention provides according to one aspect a collection vessel for a condenser of an air-conditioning system, comprising: a generally cylindrical collection vessel adapted for holding in its interior a drier, the vessel having a generally cylindrical opening to permit exchanging of the drier; a releasable lid for closing the opening in the vessel, the lid being designed as a cylindrical stopper having a seal and being adapted to be guided in an axially displaceable manner in the cylindrical opening in the collection vessel; and a securing mechanism which secures the stopper against removal in an axial direction and which is locked into place by the stopper being axially biased outwardly in response to pressure within the collection vessel. In a preferred embodiment, the securing mechanism comprises an annular securing ring which has an internal diameter and is secured against release by a blocking shoulder on the stopper which bears against the internal diameter of the securing ring.

In accordance with another aspect of the invention, there has been provided an air conditioner arrangement for a vehicle with a condenser having a block of tubes between which are arranged ribs, and having collecting tubes, one of said collecting tubes being located on each side of said block, the tubes being arranged orthogonally with respect to the collecting tubes, comprising: a collection vessel fluidly coupled to one of the collecting tubes, the collection vessel having a generally cylindrical opening therein and a releasable lid for closing the opening in the vessel; and a dryer for drying refrigerant and which is within the collection vessel, the dryer having a cage-shaped sleeve containing a dryer granulate and being removable through the opening; wherein said releasable lid for closing the opening in the vessel comprises a cylindrical stopper having a seal and being adapted to be guided in an axially displaceable manner in the cylindrical opening in the collection vessel; and a securing mechanism which secures the stopper against removal in an axial direction and which is locked into place by the stopper being axially biased outwardly in response to pressure within the collection vessel.

Further objects, features and advantages of the present invention will become apparent from the detailed description of preferred embodiments that follows, when considered together with the accompanying figures of drawing.

DETAILED DESCRIPTION OF PREFERRED EMBODIMENTS

According to one preferred embodiment of the invention, the lid is designed as a sliding stopper which is guided so that it can slide almost in the manner of a hydraulic piston inside a corresponding cylinder bore and is axially fixed by an externally arranged securing ring. As long as there is an excess pressure in the collector, the piston-like stopper is pressed outwardly against the securing ring, which is secured against release by means of a collar or blocking shoulder on the stopper. Consequently, the lid cannot be removed as long as pressure or excess pressure is prevailing in the system. Only when there is no longer excess pressure prevailing in the collector can the stopper be pressed inward from the outside, with the result that the securing ring can be exposed and removed, after which the stopper can also be removed from the collector. Advantageous refinements of the invention are described below.

These features, on the one hand, allow simple and reliable blocking of the securing ring for as long as the collection vessel is pressurized. On the other hand, designing the stopper as a hydraulic piston with sealing rings ensures a good seal and axial mobility in the cylindrical hole. Opening is simple in that the stopper simply has to be displaced axially onto an inner stop, so that it cannot fall into the collection vessel.

Figure 1:
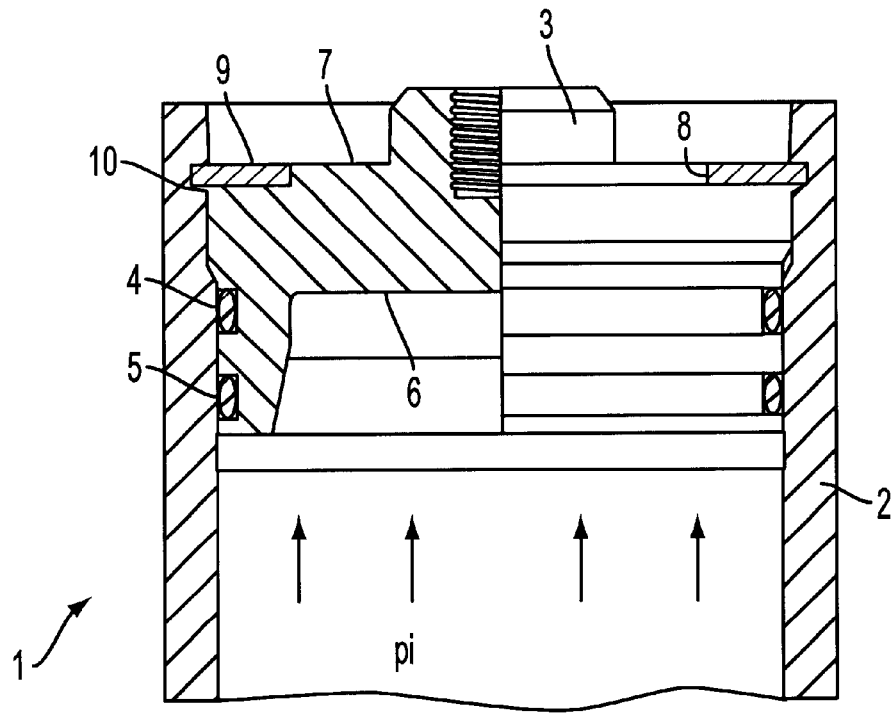
FIG. 1 shows the top part of a collection vessel in the closed state (under pressure)

Referring now to one exemplary embodiment of the invention that is illustrated in the drawings, FIG. 1 shows an only partially illustrated collection vessel 1 of a condenser for a motor vehicle air-conditioning system. The collection vessel 1 may either be designed as a separate part of the air-conditioning system or may be integrated with the condenser and its manifold to form a structural unit, as is known, for example, from DE-A 43 19 293.

The collection vessel 1 comprises a cylindrical tube, only the top part 2 of which is shown. In the upper part of the piece of tube 2 there is a stopper 3 which is of piston-like design and on its circumference has two sealing rings 4 and 5 which seal it with respect to the outside against the internal pressure $p_i$ in the tube 2. The internal pressure $p_i$ substantially acts on the inner end face 6 of the piston-like stopper 3. The outer end face 7, 7a of the stopper 3 has a blocking shoulder or collar 8, against which the internal diameter 11 of a securing ring 9 bears tightly. On the other side, the securing ring 9 is supported in an annular groove 10 in the tube 2 (which can be seen more clearly in FIG. 3) and covers an annular surface 7a (FIG. 2) of the stopper 3.

Figure 2:
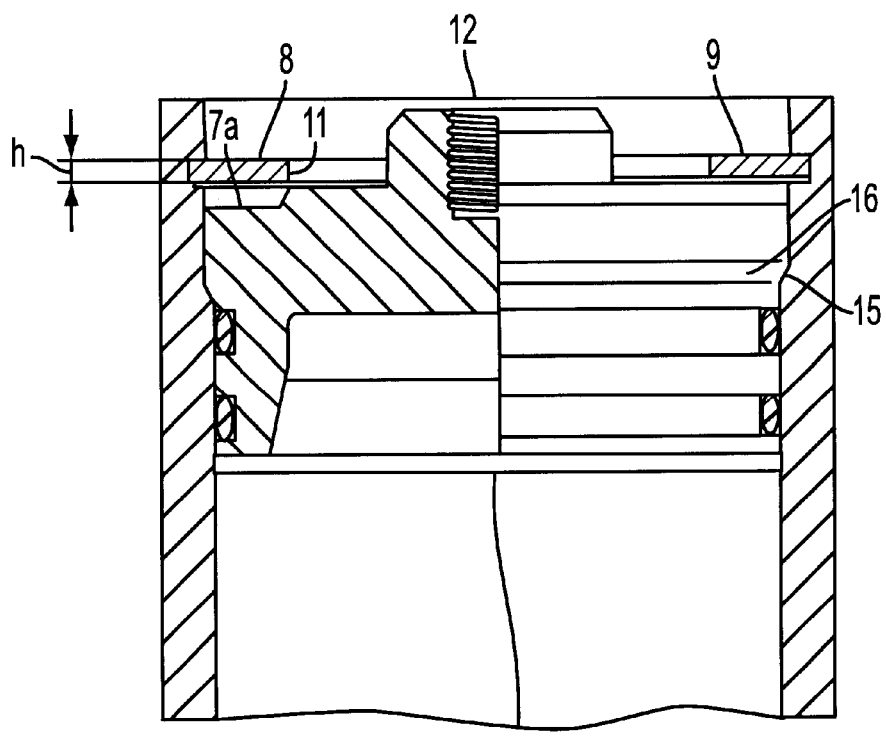
FIG. 2 shows the vessel of FIG. 1 when it is not under pressure and with the securing ring unlocked.

FIG. 2 shows the collection vessel 1 in the pressure-free state, with the stopper 3 having been displaced axially inwardly by the height h of the securing ring 9. Consequently, the blocking shoulder 8 no longer bears against the internal diameter 11 of the securing ring 9, and the securing ring 9 can be removed from the annular groove 10—in a manner known per se—by radial compression using a conventional tool. Then, the path for the stopper 3 to move outward is also free. The stopper 3 expediently has a blind, preferably threaded bore 12, into which a tool (not shown) can be screwed and by means of which the stopper 3 can be pulled out of the tube 2. Then, the drier cartridge (not shown here) can be exchanged.

Figure 3:
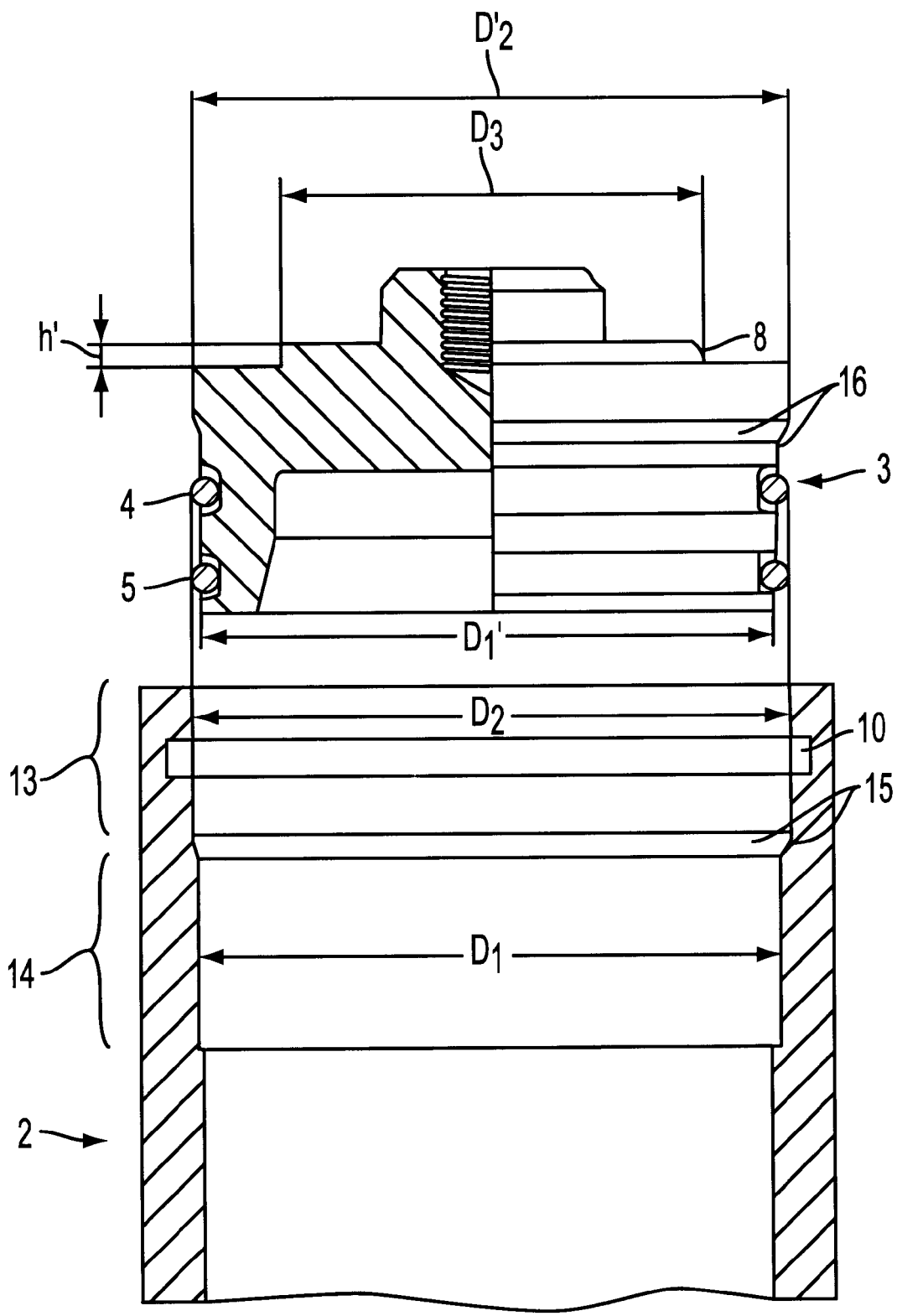
FIG. 3 shows the collection vessel and closure stopper in the dismantled state.

FIG. 3 shows stopper 3 and tube 2 in the dismantled state, or prior to assembly, oriented coaxially. The tube 2 has an outer (upper) region 13 with a hole of diameter $D_2$ and an inner region 14 with a slightly smaller diameter $D_1$. The two diameters $D_1$ and $D_2$ are connected via an encircling shoulder 15 that is designed as an inclined introduction surface with rounded transitions. In the upper region 13 of the hole, the annular groove 10 is machined into the tube 2 for holding the securing ring 9 (not shown here). In its upper region, the stopper 3 has a diameter $D_2'$ which corresponds to the diameter $D_2$ of the hole section 13, while the lower part of the stopper 3 has a slightly smaller diameter $D_1'$, which corresponds to the diameter $D_1$ of the hole section 14. Above the two sealing rings 4 and 5, which are fitted in corresponding annular grooves, there is an encircling shoulder 16, which is likewise designed as an inclined surface that rests on the hole-side inclined surface 15 during removal of the stopper 3 (see FIG. 2). The blocking shoulder 8, which is designed as an encircling collar, has a diameter $D_3$ that corresponds to the internal diameter 11 of the securing ring 9.

Therefore, when the stopper 3 is being fitted, it is—as illustrated in FIG. 3—axially aligned with the tube 2, with the sealing rings 4 and 5 already having been fitted into the annular grooves. Then, the stopper 3 is introduced into the tube 2, initially with radial play. The sealing rings 5 and 4 then come into contact with the inclined introduction surface 15 of the hole, so that they are pressed slightly inwardly. Then, as illustrated in FIG. 2, the stopper 3 is moved to a stop between the inclined surface 16 and the inclined surface 15, so that the securing ring 9 can be inserted into the annular groove 10. As soon as an internal pressure is then built up in the vessel 1, the stopper 3—in accordance with FIG. 1—moves outwardly, and the blocking shoulder 8 locks the securing ring 9 so that it cannot be removed from the annular groove. Dismantling is carried out in a similar way to FIG. 2, when there is no pressure in the collection vessel 1.

Figure 4:
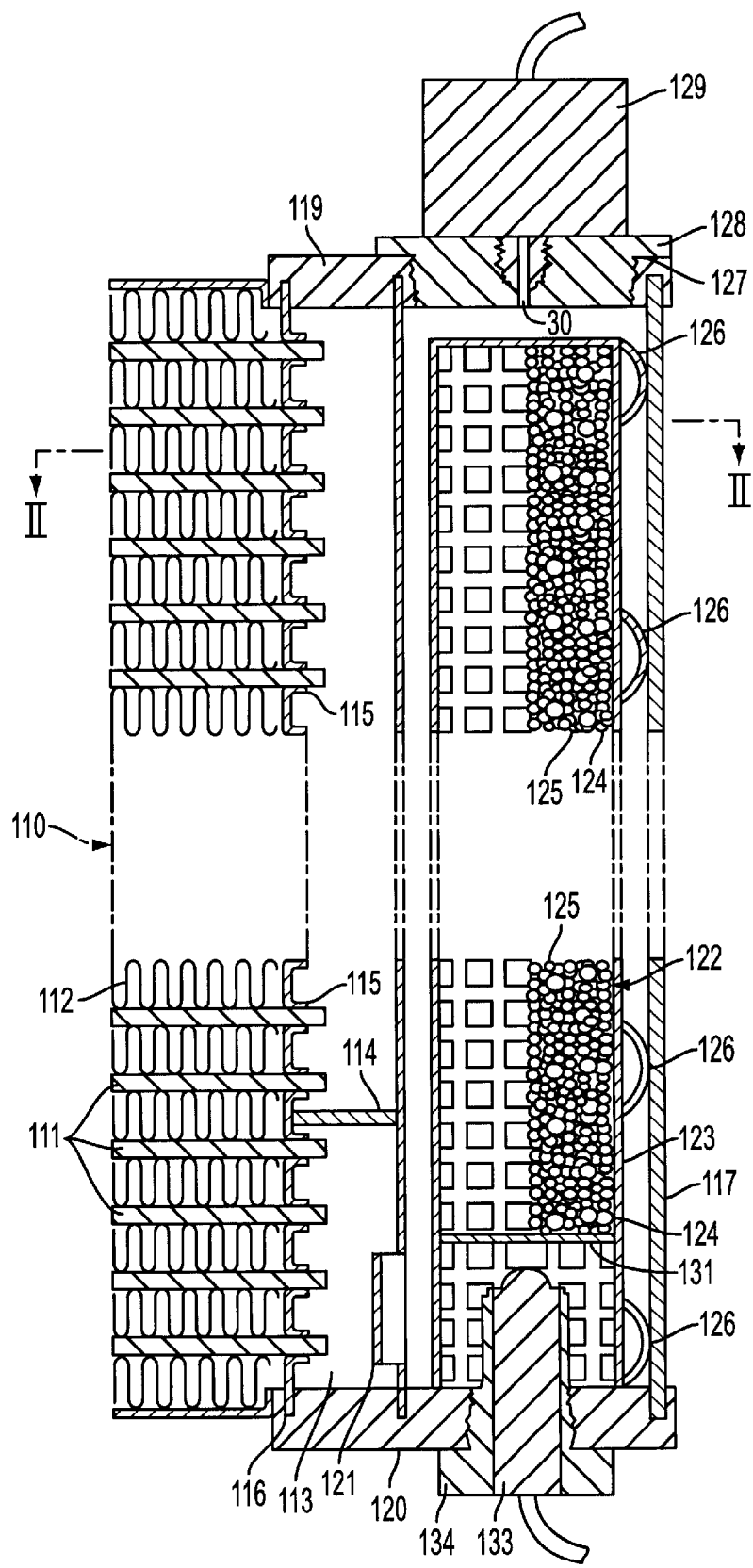
FIG. 4 is a cross-sectional view of a prior art air conditioning system and collection vessel arrangement, illustrating the type of environment in which the improved closure device according to the present invention can be employed.

FIG. 4 illustrates the overall environment of an air conditioning system in which the improved closure of the present invention can be employed. The condenser structure illustrated in FIG. 4 is that disclosed in U.S. Pat. No. 5,419,141, referred to in the introduction of this application. The condenser, only partially shown in the drawing, is part of a refrigerant circuit of an air conditioner of a vehicle, especially a motor vehicle. In this condenser, the gaseous refrigerant which arrives is liquefied once again. The condenser contains a block 110 with flat tubes 111 running horizontally, between which corrugated ribs 112 are disposed. The ends of the flat tubes 111 are inserted into collecting tubes 113 with such collecting tubes being located on both sides of the tubular ribbed block. The collecting tubes 113 are divided by partitions 114, of which only one is shown in FIG. 4, in order to create a meander-shaped flow of the refrigerant. The ends of the flat tubes 111 are inserted in passageways through a sheet-metal shape 116 which is shaped into a collecting tube 113. The collecting tube 113 shown in the drawing is formed from the shaped sheet metal 116 and from an additional tube which serves as a collector 117 and is integrated into the condenser. Collecting tube 13 and collector 17 are sealed by common sealing plates 19, 20.

Collector 117 is provided in the vicinity of its lower end with an opening 121 that provides a connection to the collecting tube 113. Preferably an additional opening is provided above partition 114 so that the lower part of collector 117 is necessarily traversed by the refrigerant.

A dryer 122 is located in collector 117. Dryer 122 has a cage-shaped sleeve 123 made of metal or plastic, whose diameter is less than the diameter of the collector 117, so that an annular gap is left between the two. A bag 124 of a fine-mesh fabric or nonwoven fabric is contained in sleeve 123 and contains a loose amount of dryer granulate. A suitable molecular sieve is used as a dryer granulate, especially Zeolite. The bag 124 is permeable to the refrigerant. Bag 124 and granulate 125 are shown in FIG. 4 only in the right-hand half of sleeve 123 shown in the drawing although the entire sleeve 123 is filled with it.

Sleeve 123 is provided on its exterior with elastic spacers 126 shaped for example in the manner of spring clips on the sleeve 123. These spacers 126 are arranged at angular intervals of 120 degrees, and serve to center the sleeve 123 in the collector 117.

The upper sealing plate 119 has an opening designed as a threaded bore whose cross-section is greater than the cross-section of the sleeve 123. This opening is sealed with interposition of a sealing ring 127 with a screw cover 128. After the screw cover 128 is removed, the dryer 122 is readily accessible and can be removed at the top. The closure according to the present invention can be advantageously substituted for the screw cover 128 of the prior art.

Although the invention has been described in terms of several preferred embodiments, it is understood by those skilled in the art that other embodiments can be designed to operate in accordance with the principles of the invention. For example, any type of conventional securing mechanism can be substituted in place of securing ring 9, which is locked in response to internal pressure within the vessel. Other configurations can be substituted for blind bore 12 as a means for removing the stopper 3, e.g., a bayonet fitting. It is intended that the accompanying claims will cover all reasonably comprehended equivalents of the disclosed invention.

The entire disclosure of the priority document, German Patent Application No. 199 43 322.4, is hereby incorporated by reference.

What is claimed is:

1. A collection vessel for a condenser of an air-conditioning system, comprising:
   a generally cylindrical collection vessel adapted for holding in its interior a drier, the vessel having a generally cylindrical opening to permit exchanging of the drier;
   a releasable lid for closing the opening in the vessel, the lid comprising a cylindrical stopper having a seal and being adapted to be guided in an axially displaceable manner in the cylindrical opening in the collection vessel; and
   a securing mechanism which secures the stopper against removal in an axial direction and which is locked into place by the stopper being axially biased outwardly to physically obstruct movement of the securing mechanism in response to pressure within the collection vessel.

2. A collection vessel as claimed in claim 1, wherein the securing mechanism comprises an annular securing ring which has an internal diameter and is secured against release by a blocking shoulder on the stopper which bears against the internal diameter of the securing ring.

3. A collection vessel as claimed in claim 2, wherein the cylindrical opening includes an annular groove and the securing ring is inserted in the annular groove and covers an annular end face on the outer side of the stopper which is delimited on the inside by the blocking shoulder.

4. A collection vessel as claimed in claim 2, wherein the blocking shoulder has a height h' approximately corresponding to the height h of the securing ring.

5. A collection vessel as claimed in claim 1, wherein the stopper seal comprises at least one sealing ring about the circumference of the stopper.

6. The collection vessel as claimed in claim 1, wherein the opening has a shoulder which is designed as an inclined introduction surface and connects an outer section of larger diameter $D_2$ and an inner section of smaller diameter $D_1$.

7. A collection vessel as claimed in claim 6, further comprising an encircling stop on the circumference of the stopper above the seal which bears against the shoulder to prevent insertion of the stopper beyond a predetermined distance into the opening.

8. A collection vessel as claimed in claim 1, wherein the securing mechanism is obstructed from radial movement by the stopper being axially biased outwardly.

9. A collection vessel as claimed in claim 1, wherein the securing mechanism is obstructed from radial movement by the stopper being axially moved in response to being biased outwardly.

10. An air conditioner arrangement for a vehicle with a condenser having a block of tubes between which are arranged ribs, and having collecting tubes, one of said collecting tubes being located on each side of said block, the tubes being arranged orthogonally with respect to the collecting tubes, comprising:
    a collection vessel fluidly coupled to one of the collecting tubes, said collection vessel having a generally cylindrical opening therein and a releasable lid for closing the opening in the vessel; and
    a dryer for drying refrigerant and which is within the collection vessel, the dryer having a cage-shaped sleeve containing a dryer granulate and being removable through said opening;
    wherein said releasable lid for closing the opening in the vessel comprises a cylindrical stopper having a seal and being adapted to be guided in an axially displaceable manner in the cylindrical opening in the collection vessel; and a securing mechanism which secures the stopper against removal in an axial direction and which is locked into place by the stopper being axially biased outwardly to physically obstruct movement of the securing mechanism in response to pressure within the collection vessel.

11. An air conditioner arrangement as claimed in claim 10, wherein the securing mechanism comprises an annular securing ring which has an internal diameter and is secured against release by a blocking shoulder on the stopper which bears against the internal diameter of the securing ring.

12. An air conditioner arrangement as claimed in claim 11, wherein the cylindrical opening includes an annular groove and the securing ring is inserted in the annular groove and covers an annular end face on the outer side of the stopper which is delimited on the inside by the blocking shoulder.

13. An air conditioner arrangement as claimed in claim 10, wherein the stopper seal comprises at least one sealing ring about the circumference of the stopper.

14. An air conditioner arrangement for a vehicle, having a high pressure side and a low pressure side defined by a compressor and having a condenser comprising a block of tubes between which are arranged ribs, and having collecting tubes, one of said collecting tubes being located on each side of said block, the tubes being arranged orthogonally with respect to the collecting tubes, and comprising:
    a collection vessel located on the high pressure side of air conditioner arrangement and fluidly coupled to one of the collecting tubes, said collection vessel having a generally cylindrical opening therein and a releasable lid for closing the opening in the vessel; and
    a dryer for drying refrigerant and which is within the collection vessel, the dryer having a cage-shaped sleeve containing a dryer granulate and being removable through said opening; wherein said releasable lid for closing the opening in the vessel comprises a cylindrical stopper having a seal and being adapted to be guided in an axially displaceable manner in the cylindrical opening in the collection vessel; and a securing mechanism which secures the stopper against removal in an axial direction and which is locked into place by the stopper being axially biased outwardly to positively prevent removal of the securing mechanism in response to pressure within the collection vessel.

15. An air conditioner arrangement according to claim 14, wherein the securing mechanism is physically obstructed from movement by the stopper being biased outwardly in response to pressure within the collection vessel.

16. An air conditioner arrangement according to claim 15, wherein securing mechanism is obstructed from radial movement by the stopper being axially biased outwardly.

17. An air conditioner arrangement according to claim 16, wherein the securing mechanism is obstructed from radial movement by the stopper being axially moved in response to being biased outwardly.

* * * * *